United States Patent [19]

Schuler

[11] 4,162,905
[45] Jul. 31, 1979

[54] AIR INTAKE FILTER WITH CYCLONE SEPARATOR STAGE

[75] Inventor: Gustav Schuler, Ludwigsburg, Fed. Rep. of Germany

[73] Assignee: Filterwerk Mann & Hummel GmbH, Ludwigsburg, Fed. Rep. of Germany

[21] Appl. No.: 858,337

[22] Filed: Dec. 7, 1977

[30] Foreign Application Priority Data

Dec. 8, 1976 [DE] Fed. Rep. of Germany ... 7638324[U]

[51] Int. Cl.² .................. B01D 45/16; B01D 45/06
[52] U.S. Cl. .................................... 55/337; 55/396; 55/397; 55/457
[58] Field of Search ............... 55/337, 396, 397, 398, 55/394, 325, 326, 424, 426, 457

[56] References Cited

U.S. PATENT DOCUMENTS

| | | | |
|---|---|---|---|
| 2,418,381 | 4/1947 | Wegmann | 55/398 |
| 3,078,650 | 2/1963 | Anderson et al. | 55/337 |
| 3,319,404 | 5/1967 | Lowther | 55/337 |
| 3,382,651 | 5/1968 | Hahl et al. | 55/426 |
| 3,399,515 | 9/1968 | Hahl | 55/426 |
| 3,429,108 | 2/1969 | Larson | 55/337 |
| 3,508,383 | 4/1970 | Humbert, Jr. et al. | 55/337 |
| 3,672,130 | 6/1972 | Sullivan et al. | 55/337 |
| 3,907,529 | 9/1975 | Borsheim | 55/337 |
| 4,017,278 | 4/1977 | Reese | 55/337 |
| 4,020,783 | 5/1977 | Anderson et al. | 55/337 |

FOREIGN PATENT DOCUMENTS

1711740  11/1955  Fed. Rep. of Germany .

*Primary Examiner*—Frank W. Lutter
*Assistant Examiner*—Gregory N. Clements
*Attorney, Agent, or Firm*—Joseph A. Geiger

[57] ABSTRACT

An air intake filter for combustion engines and other air-aspirating machines having a cyclone-type separator stage arranged upstream of a strainer-type filter element. This is accomplished with a filter assembly consisting of an enclosed cylindrical filter housing holding a hollow-cylindrical filter element between its axial ends, the incoming raw air flowing first into an annular raw air space which serves as a cyclone separation chamber, where it is given a helical swirl, and from where the air flows radially inwardly through the filter element. In the bottom portion of the separation chamber is arranged a sheet metal baffle collar with perforations in the form of blind cuts, which create intermediate web portions. The latter are so inclined that the circumferential motion component of the air swirl is reversed, as the raw air passes through the baffle collar, thereby preventing entrainment of particulate matter towards the filter element.

3 Claims, 5 Drawing Figures

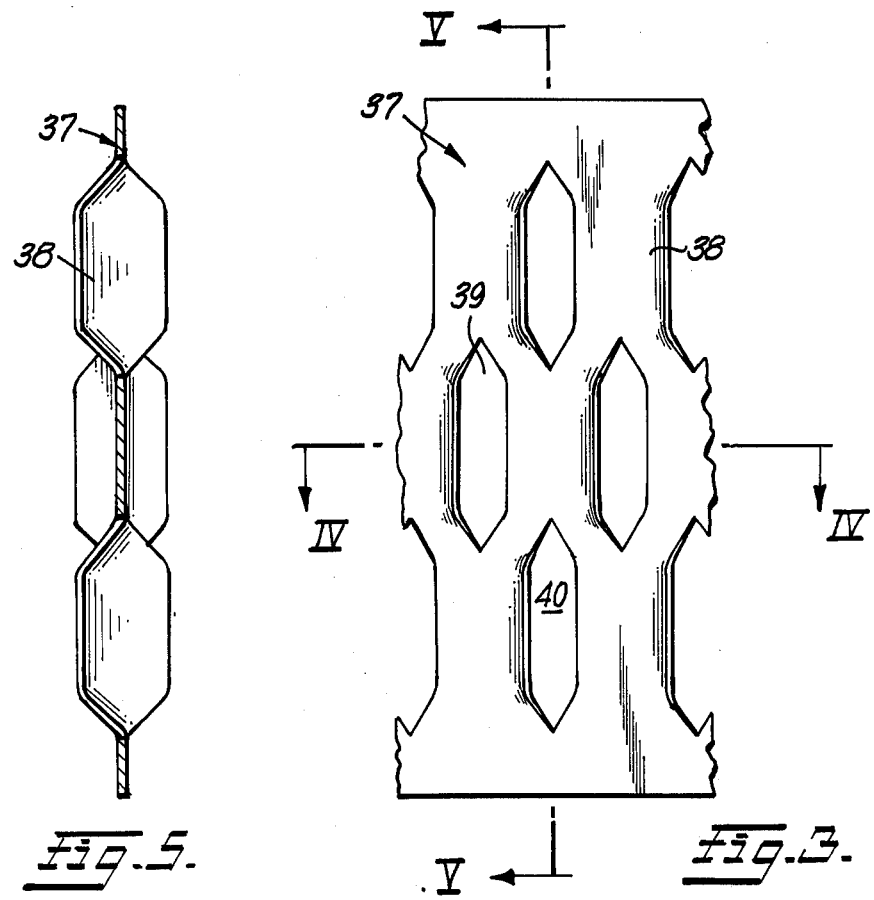

AIR INTAKE FILTER WITH CYCLONE SEPARATOR STAGE

BACKGROUND OF THE INVENTION

1. Field of the Invention

The present invention relates to air intake filters for combustion engines, compressors, and other air-aspirating machinery and, more particularly, to an air intake filter having a cyclone separator stage arranged upstream of a strainer-type filter element.

2. Description of the Prior Art

The design of an air intake filter of the type under consideration involves a compromise between two opposing requirements: It is desirable, on the one hand, to achieve a high degree of dust separation, in conjunction with an extended service life, in order to avoid the need for frequent servicing of the filter element through cleaning or replacement. On the other hand, the specific machine application in which the air intake filter is used, is frequently subject to limitations of available space and visibility, so that certain overall dimensions cannot be exceeded.

It is known from the prior art that the service life of a filter element with a high degree of dust separation can be considerably increased through the arrangement of a cyclone separator stage upstream of the filter element. The requirement of minimal overall dimensions is being optimally met by arranging the cyclone separation chamber concentrically with the filter element, between the latter and the housing wall of the filter assembly.

A known filter assembly of this type is disclosed in German Gebrauchsmuster (Utility Model) No. 17 11 740. This prior art publication shows, in FIGS. 8 and 9, a fitler assembly with a pot-shaped housing inside which is arranged a hollow-cylindrical filter element of fine-filtering paper surrounded by a cyclone separation chamber. In this chamber, the incoming air is precleaned in an axial cyclone action. The air enters through a series of apertures in the top cover of the assembly, whereupon it is deflected into a helical downward swirl by means of inclined deflector vanes.

Upper and lower cylindrical baffles, with an axial flow gap therebetween, form the inner wall of the cyclone separation chamber. These baffles are spaced a distance from the outer periphery of the filter element so that the precleaned air, after flowing radially inwardly through said gap, is sufficiently distributed over the height of the filter element. One shortcoming of this arrangement is that it requires a considerable radial space for the cyclone stage, reflecting itself in a large overall diameter of the filter assembly. Comparitive tests have shown that, if the radial width of the separation chamber is reduced, because of limited space available, the degree of dust separation is greatly diminished.

SUMMARY OF THE INVENTION

Underlying the present invention is the objective of designing an air intake filter of the type described above which, while requiring less space than known filter assemblies, has a high degree of dust separation in the cyclone separator stage.

In order to attain this objective, the present invention suggests a filter assembly which consists of an enclosed pot-shaped filter housing with a removable cover on its lower axial end, a hollow-cylindrical filter element defining a clean air space inside the filter element and an annular raw air space or cyclone separation chamber between the filter element and the filter housing, and an air outlet and air inlet communicating with said clean air space and raw air space, respectively. In the upper portion of the raw air space is arranged a baffle cylinder with deflector vanes producing a downwardly directed helical swirl of incoming raw air, thereby creating a cyclone-type air cleaning action by projecting particulate matter entrained by the air outwardly and downwardly towards a dust collecting sash near the bottom of the raw air space.

The dust collecting sash carries an upwardly extending perforated baffle collar of sheet metal, the perforations being so arranged that the air passing therethrough is deflected to have a circumferential motion component which is opposed to the circumferential motion component of the helically swirling raw air, thereby preventing the air flow from entraining particulate matter through the perforations of the baffle collar.

In a preferred embodiment of the invention, the perforations in the baffle collar are in the form of several rows of axially extending blind cuts, arranged in a staggered pattern, so as to define intermediate web portions which are bent out of alignment with the collar wall, in a louver-like fashion. Conveniently, the baffle collar is fabricated of commercially available expanded sheet metal having these characteristics. The inclination of the bent intermediate web portions is preferably such that the air passing through the perforation passages is deflected more than 90 degrees from the swirling flow direction in the separation chamber. The particulate matter, because of its greater mass, cannot follow this sharp deflection, remaining in the separation chamber and settling on the dust collecting sash. A suitable dust discharge connector leads from the dust collecting sash to the outside, for removal of the accumulated particulate matter.

BRIEF DESCRIPTION OF THE DRAWINGS

Further special features and advantages of the invention will become apparent from the description following below, when taken together with the accompanying drawings which illustrate, by way of example, a preferred embodiment of the invention, represented in the various figures as follows:

FIG. 3 shows, at an enlarged scale, an elevational view of the perforations and intermediate web portions of the baffle collar of the embodiment of FIG. 1;

FIG. 4 shows the perforations and intermediate web portions of FIG. 3 in a transverse cross section taken along lines IV—IV of FIG. 3; and FIG. 5 shows the perforations and intermediate web portions of FIG. 3 in an elevational cross section taken along line V—V of FIG. 3.

DESCRIPTION OF THE PREFERRED EMBODIMENT

Figure 1:
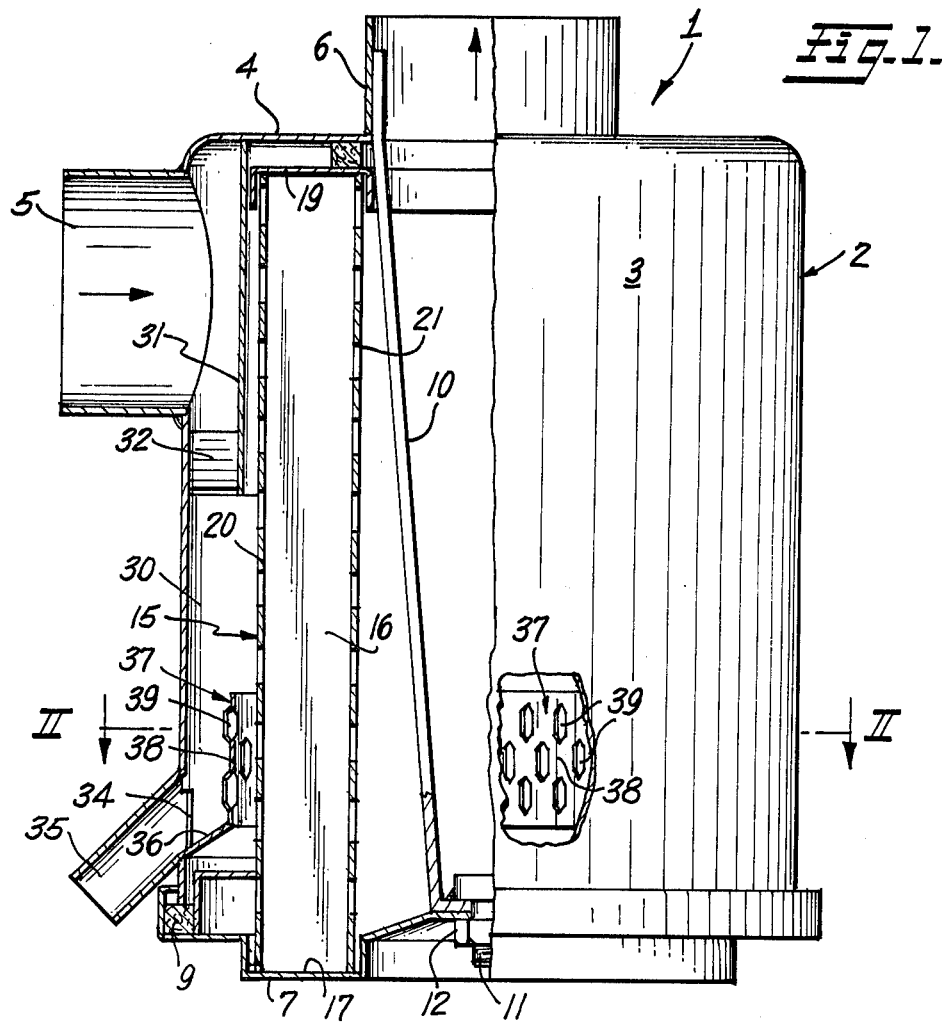
FIG. 1 shows, in an elevational representation which is partially cross-sectioned, a filter assembly embodying the invention.
Figure 2:
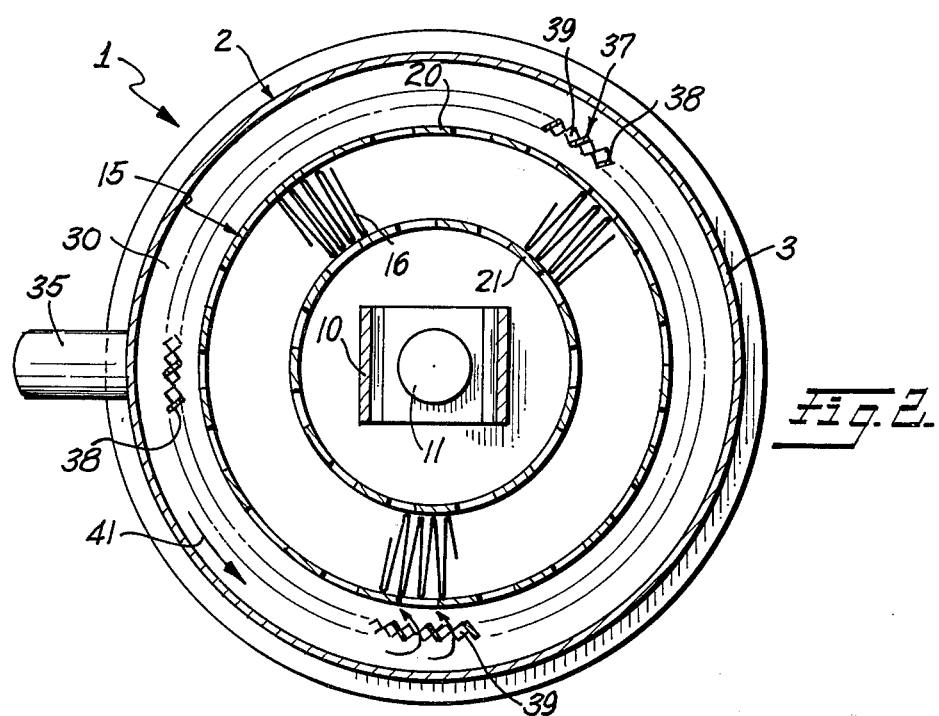
FIG. 2 is a transverse cross section through the filter assembly of FIG. 1, taken along line II—II thereof.

Referring to FIGS. 1 and 2 of the drawing, there can be seen a filter assembly 1 consisting essentially of a housing 2 with the outline of an inverted pot, having a cylindrical housing wall 3 and a generally flat bottom wall 4 on its upper axial side. A radially oriented raw air intake connector 5 opens into the cylindrical housing wall 3, near the upper end thereof. An axially oriented clean air outlet connector 6 is arranged in the center of the bottom wall 4. The outlet connector 6 is designed for connection to an air-aspirating machine, using a suitable air hose, air pipe, or other flow connection.

The lower axial side of the housing 2 is constituted by a removable cover 7, a gasket 9 producing an airtight closure. The filter cover 7 is clamped against the opening of the housing 2 by means of a clamping nut 12 and a threaded stud 11 which is welded to a cover supporting yoke 10. The latter reaches axially through the filter assembly 1, being permanently attached to the inner wall of the air outlet connector 6. The housing cover 7 can thus be readily removed by simply unscrewing the central clamping nut 12.

In the space enclosed by the filter housing 2 and its cover 7 is arranged a hollow-cylindrical filter element 15 of conventional design, preferably in the form of a folded star 16 of fine-filtering paper. The lower extremity of the filter element 15 is positioned inside an annular axial recess 17 of the filter cover 7. The opposite axial extremity of the filter element 15 carries a glued-on end cover 19. A bottom gasket 23 is clampingly retained between the end cover 19 and the bottom wall 4 of the filter housing 2. The inner and outer peripheries of the hollow filter element 15 are covered with perforated outer and inner sleeves 20 and 21, respectively.

The annular raw air space between the cylindrical wall 3 of the housing 2 and the filter element 15 is designed to serve as a cyclone separation chamber 30. For this purpose, there is arranged, in the upper portion of this annular space, a baffle cylinder 31 which faces the raw air intake connector 5 so as to prevent the incoming raw air from flowing directly towards the filter element 15. The raw air, flowing initially around the baffle cylinder 31, is deflected axially downwardly and given a helically swirling motion, as it flows past a series of deflector vanes 32 which are arranged at the lower extremity of the baffle cylinder 31.

A short distance above the lower extremity of the raw air space or separation chamber 30 is arranged a tapered dust collecting sash 36 whose outer periphery is attached to the inside of the cylindrical housing wall 3, forming an acutely angled dust collecting recess therewith. A dust discharge port 34 in the housing wall 3 connects the dust collecting recess with a downwardly slanting dust discharge connector 35 on the outside of the filter housing. To the dust discharge connector 35 may be attached a suitable pipe or flexible hose which leads to a filter dust ejecting device in the exhaust system of the combustion engine, or to a dust receptacle. The dust discharge connector may also be equipped with a dust discharge valve.

The inner periphery of the tapered dust collecting sash 36 is spaced a short distance from the outer diameter of the filter element 15, carrying a generally cylindrical perforated baffle collar 37. The latter extends upwardly from the sash 36, thereby covering a length portion of the filter element 15, while leaving exposed between it and the downwardly extending baffle cylinder 31 a central length portion of the filter element 15.

The perforated baffle collar 37 is shown in greater detail in FIGS. 3–5, the curvature of the collar having been omitted, for the sake of simplicity of the drawing. As can be seen in FIG. 3, the perforations in the baffle collar 37 are the result of a series of regularly spaced offset blind cuts 39 which define web portions 38 between circumferentially adjacent pairs of cuts 39. The intermediate web portions 38 are bent out of alignment with the surface extent of the baffle collar 37, thereby opening up the cuts and creating oblique flow passages 40 across the baffle collar 37, as can be seen in FIG. 4.

The orientation of the oblique flow passages 40 in the baffle collar 37 is such that an almost complete flow reversal is imposed on the helically swirling raw air in the circumferential sense, as the air flows through the baffle collar 37 towards the filter element 15. A certain kind of expanded sheet metal lends itself conveniently for use as a baffle collar of the kind suggested by the invention.

The filter assembly of the present invention operates as follows: As raw air flows into the filter housing 2, through its intake connector 5, it is deflected axially downwardly by the baffle cylinder 31 and also deflected in a counterclockwise circumferential sense by the deflector vanes 32. The result is a downwardly advancing helical swirl of raw air inside the separation chamber 30. The cyclone-type cleaning action on the raw air causes heavier particulate matter to be projected radially outwardly and downwardly against the cylindrical housing wall 3. The particulate matter collects on the dust collecting sash 36, being removed from the filter through the dust discharge port 34 and the dust discharge connector 35. The precleaned raw air then flows radially inwardly, through the fine-filtering element 15 into the clean air space at the inside of the latter. The air-aspirating machine draws the clean air axially out of the filter assembly 1, through the clean air outlet connector 6.

The purpose of the arrangement of a perforated baffle collar 37, supported by the dust collecting sash 36, is to make sure that the raw air swirling into the lower portion of the dust separation chamber 30 will not entrain into the filter element 15 the dust which is accumulating on the dust collecting sash 36. This is effectively accomplished by the earlier-mentioned circumferential deflection of the raw air, as it flows through the inclined air passages 40 of the baffle collar 37. Before reaching these passages in the baffle collar 37, the dust particles move with the helical swirl of raw air in a counterclockwise direction, as indicated by the arrow 41. Because these particles are much heavier than the air, they cannot follow the sharp change in direction which is imposed on the air by the inclined web portions 38 of the baffle collar 37. The dust particles are thus separated from the inwardly curving air flow, moving downwardly, where they collect on the dust collecting sash 36.

It should be understood, of course, that the foregoing disclosure describes only a preferred embodiment of the invention and that it is intended to cover all changes and modifications of this example of the invention which fall within the scope of the appended claims.

I claim the following:

1. A filter assembly designed to serve as an air intake filter for a combustion engine, compressor, or other air-aspirating machine, the filter assembly comprising in combination:

an enclosed round filter housing defining a longitudinal axis for the filter assembly, one axial side of the housing being accessible through a removable cover;

a hollow-cylindrical filter element extending axially inside the filter housing and thereby subdividing the enclosed housing space into a clean air space inside the filter element and an annular raw air space between the filter element and the housing;

an air inlet communicating with the raw air space of the housing, and an air outlet communicating with the clean air space of the housing;

a dust-collecting sash arranged in the raw air space, near an axial extremity thereof;

first air deflecting means arranged inside the raw air space of the housing for imparting to the incoming flow of raw air a helical swirl which is directed towards the dust collecting sash, the raw air space thereby serving as a separation chamber, while a cyclone-type air precleaning action takes place in said chamber, heavier particulate matter entrained by the air being projected against the dust-collecting sash in the separation chamber;

a dust discharge port arranged near the dust-collecting sash of the separation chamber;

a perforated baffle collar concentrically surrounding the filter element with a flow gap therebetween and extending axially from the dust-collecting sash of the separation chamber a distance into said chamber, the perforation of said baffle collar thereby serving as a second air deflecting means for guiding a portion of the helically swirling raw air inwardly from the separation chamber, through the baffle collar, towards the filter element, in a flow direction which has a circumferential motion component opposed to the circumferential motion component of said helically swirling raw air, said deflection in the circumferential sense preventing the air flow from entraining the heavier particulate matter through the perforation of the baffle collar.

2. A filter assembly as defined in claim 1, wherein the baffle collar is a thin-walled tubular member;

the perforations in the baffle collar are closely spaced, substantially axially oriented blind cuts in the collar wall which define web portions between pairs of circumferentially spaced cuts; and the web portions are oriented out of alignment with the overall extent of the collar wall, so as to form a series of louver-type passages which serve as said second air deflecting means.

3. A filter assembly as defined in claim 2, wherein the blind cuts in the collar wall are arranged in a pattern of circumferentially regularly spaced cuts forming a succession of circumferential rows of cuts; and axially adjacent rows of cuts are circumferentially offset from one another by one-half the circumferential spacing between cuts.

* * * * *